(12) United States Patent
Grover

(10) Patent No.: US 12,153,702 B2
(45) Date of Patent: Nov. 26, 2024

(54) USING A TRUSTED AUTHORITY TO ENFORCE ENCRYPTION LEVELS/AUTHENTICATION LEVELS IN A BLOCKCHAIN

(71) Applicant: MICRO FOCUS LLC, Santa Clara, CA (US)

(72) Inventor: Douglas Max Grover, Rigby, ID (US)

(73) Assignee: Micro Focus LLC, Santa Clara, CA (US)

( * ) Notice: Subject to any disclaimer, the term of this patent is extended or adjusted under 35 U.S.C. 154(b) by 233 days.

(21) Appl. No.: 17/681,077

(22) Filed: Feb. 25, 2022

(65) Prior Publication Data

US 2023/0274020 A1    Aug. 31, 2023

(51) Int. Cl.
  *G06F 21/62* (2013.01)
  *H04L 9/32* (2006.01)
  *H04L 9/00* (2022.01)

(52) U.S. Cl.
  CPC .......... *G06F 21/6227* (2013.01); *H04L 9/321* (2013.01); *H04L 9/50* (2022.05)

(58) Field of Classification Search
  CPC .................................. G06F 21/62; H04L 9/32
  See application file for complete search history.

(56) References Cited

U.S. PATENT DOCUMENTS

| | | | |
|---|---|---|---|
| 10,833,843 B1 * | 11/2020 | Vijayvergia | H04L 9/3242 |
| 10,880,077 B2 * | 12/2020 | Wei | G06F 21/6218 |
| 11,288,380 B2 * | 3/2022 | Kumar | H04L 9/3239 |
| 11,356,268 B2 * | 6/2022 | Balinsky | G06K 15/4095 |
| 11,468,046 B2 * | 10/2022 | Conley | G06F 16/2379 |
| 11,626,986 B1 * | 4/2023 | Horoszczak | H04L 9/088 |
| | | | 705/51 |
| 11,645,369 B2 * | 5/2023 | Wojcik | H04L 9/3247 |
| | | | 726/6 |
| 11,816,475 B2 * | 11/2023 | Angelo | H04L 9/3247 |
| 11,824,987 B2 * | 11/2023 | Grover | H04L 9/50 |
| 11,924,322 B2 * | 3/2024 | Gleichauf | H04W 4/70 |
| 2020/0057860 A1 * | 2/2020 | Patil | G06F 21/6209 |
| 2020/0065826 A1 * | 2/2020 | Gering | G06K 7/1094 |

(Continued)

FOREIGN PATENT DOCUMENTS

| | | |
|---|---|---|
| CN | 106503994 B | 7/2020 |
| CN | 111859443 A | 10/2020 |

(Continued)

*Primary Examiner* — Viral S Lakhia
(74) *Attorney, Agent, or Firm* — Sheridan Ross P.C.

(57) ABSTRACT

A request to create a blockchain is received. In response to receiving the request to create a blockchain, an authentication/encryption block is added to the blockchain. For example, the authentication/encryption block may be part of a genesis block of the blockchain. The authentication/encryption block comprises metadata that indicates at least one of: 1) an encryption level for blockchain data that will be part of the blockchain, 2) an encryption type for the blockchain data that will be part the blockchain, 3) an authentication level required to access the blockchain data that will be part of the blockchain, and a security level for the blockchain data that will be part of the blockchain. The metadata is used to define encryption and/or authentication requirements for accessing the blockchain data.

20 Claims, 11 Drawing Sheets

(56) References Cited

U.S. PATENT DOCUMENTS

| | | | |
|---|---|---|---|
| 2020/0119936 A1* | 4/2020 | Balasaygun | H04L 12/1831 |
| 2021/0303713 A1* | 9/2021 | Sreedhar | H04L 9/50 |
| 2022/0393871 A1* | 12/2022 | Joseph | H04L 9/3226 |
| 2022/0417026 A1* | 12/2022 | Grover | H04L 9/3236 |
| 2023/0206173 A1* | 6/2023 | Grover | G06K 7/10366 |
| | | | 705/28 |
| 2023/0275763 A1* | 8/2023 | Angelo | H04L 9/3239 |
| | | | 713/189 |

FOREIGN PATENT DOCUMENTS

| | | |
|---|---|---|
| WO | WO-2018032374 A1 | 2/2018 |
| WO | WO-202112061 W | 1/2021 |

* cited by examiner

USING A TRUSTED AUTHORITY TO ENFORCE ENCRYPTION LEVELS/AUTHENTICATION LEVELS IN A BLOCKCHAIN

BACKGROUND

To access sensitive information in a blockchain, access to the blockchain data is normally defined external to the blockchain. This limits the ability to protect sensitive information in the blockchain.

SUMMARY

These and other needs are addressed by the various embodiments and configurations of the present disclosure. The present disclosure can provide several advantages depending on the particular configuration. These and other advantages will be apparent from the disclosure contained herein.

A request to create a blockchain is received. In response to receiving the request to create a blockchain, an authentication/encryption block is added to the blockchain. For example, the authentication/encryption block may be part of a genesis block of the blockchain. The authentication/encryption block comprises metadata that indicates at least one of: 1) an encryption level for blockchain data that will be part of the blockchain, 2) an encryption type for the blockchain data that will be part the blockchain, 3) an authentication level required to access the blockchain data that will be part of the blockchain, and a security level for the blockchain data that will be part of the blockchain. The metadata is used to define encryption and/or authentication requirements for accessing the blockchain data.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
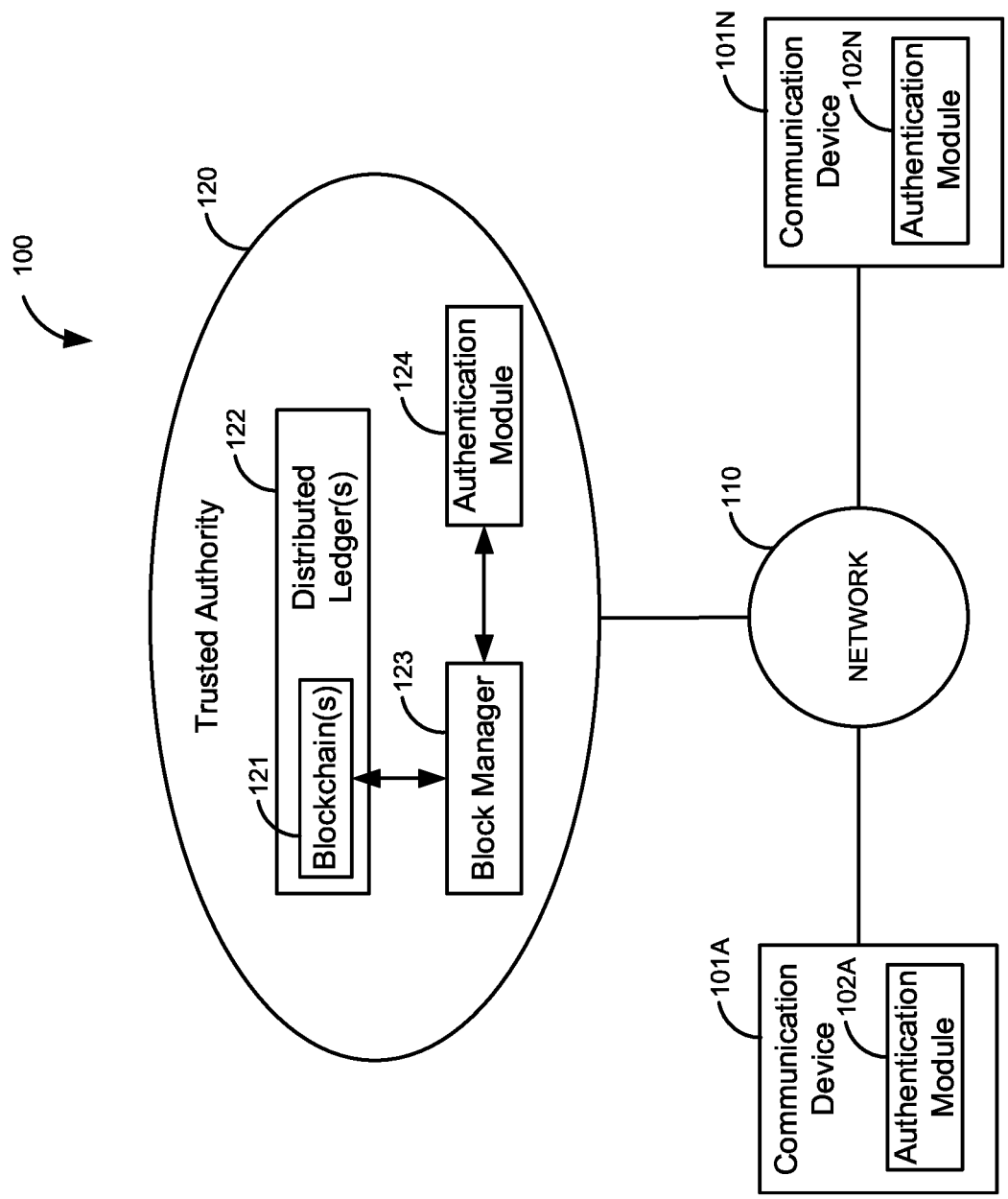
FIG. 1 is a block diagram of a first illustrative system for using a trusted authority to enforce encryption levels/authentication levels in a blockchain.

FIG. 1 is a block diagram of a first illustrative system 100 for using a trusted authority 120 to enforce encryption levels/authentication levels in a blockchain 121. The first illustrative system 100 comprises communication devices 101A-101N, a network 110, and a trusted authority 120.

The communication devices 101A-101N can be or may include any device that can communicate on the network 110, such as a Personal Computer (PC), a telephone, a video system, a cellular telephone, a Personal Digital Assistant (PDA), a tablet device, a notebook device, a smartphone, a server, and/or the like. As shown in FIG. 1, any number of communication devices 101A-101N may be connected to the network 110, including only a single communication device 101.

The communication devices 101A-101N further comprise authentication modules 102A-102N. The authentication modules 102A-102N can be or may include any hardware coupled with software that can be used to authenticate a user. The authentication modules 102A-102N may support various types of authentications, such as, username/passwords, Short Message Service (SMS) codes, email codes, biometrics, user questions, digital certificates, and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The trusted authority 120 can be or may include any entity, service, process, and/or the like that can be used to provide trusted services. The trusted services may include encryption services, digital certificate management, authentication services, security services, and/or the like. The trusted authority 120 comprises blockchain(s) 121, distributed ledger(s) 122, a block manager 123, and an authentication module 124.

The blockchain(s) 121 may be created using known blockchain structures in conjunction with the processes described herein. The blockchain(s) 121 are typically part of a distributed ledger 122. The distributed ledger 122 is a replicated copy of the blockchain(s) 121 that provide enhanced immutability of the blockchain(s) 121.

The block manager 123 manages the creation of the blockchain and adding blocks to the blockchain(s) 121. In one embodiment, the block manager 123 works with the distributed ledger 122 to do a consensus vote when a new block is added to the blockchain(s) 121.

The authentication module 124 is used to authenticate a user in conjunction with the authentication modules 102A-102N. The authentication module 124 may provide authentication services for individual users, groups of users, corporations, entities, domains, and/or the like via the communication devices 101A-101N.

Figures 2A, 2B:
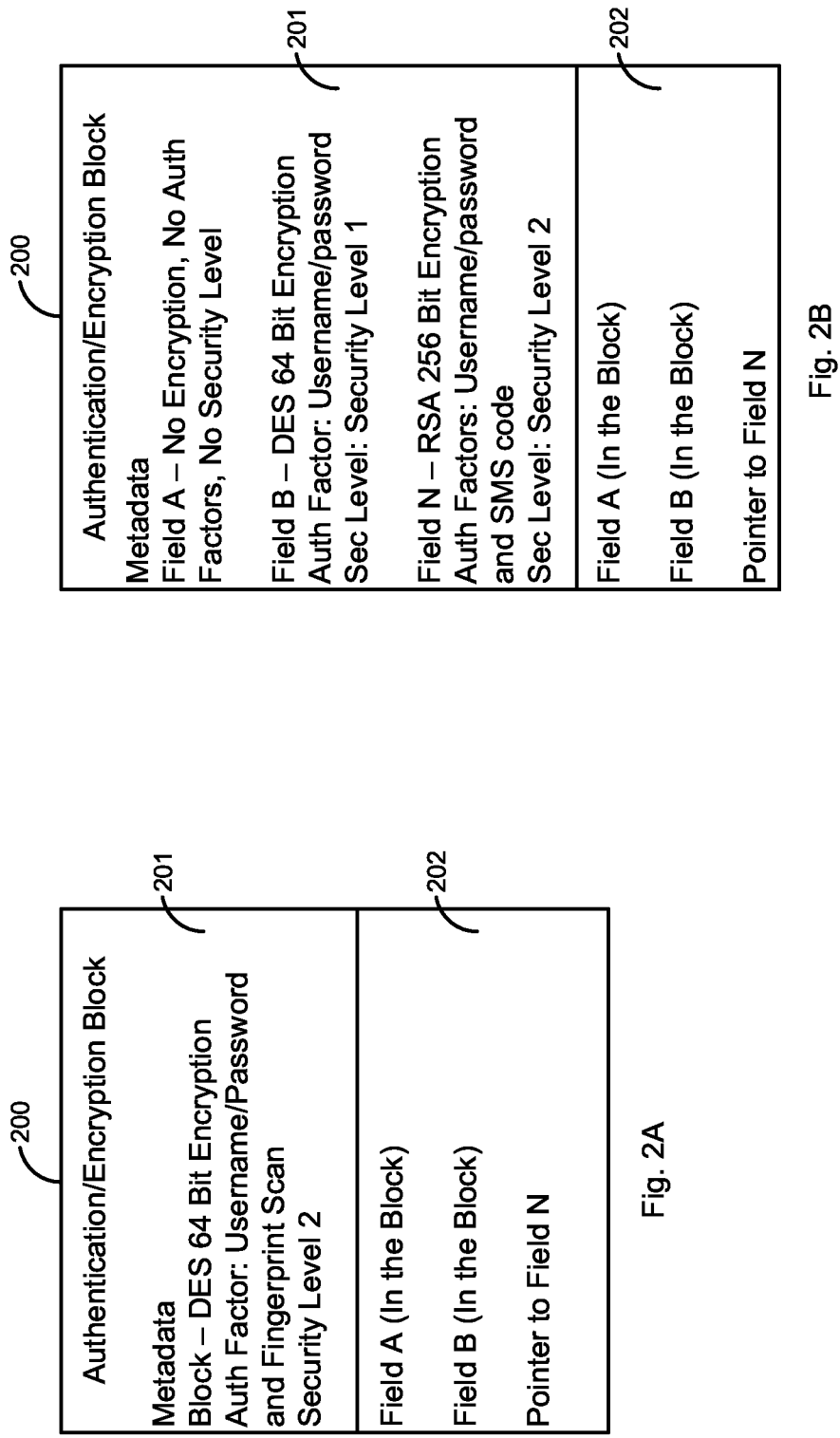
FIG. 2A is a diagram of a first illustrative authentication/encryption block.
FIG. 2B is a diagram of a second illustrative authentication/encryption block.

FIG. 2A is a diagram of a first illustrative authentication/encryption block 200. The authentication/encryption block 200 is used to identify various types of information about how the blockchain 121 and/or the authentication/encryption block 200 functions, such as authentication information, encryption information, security level information, and/or the like. The authentication/encryption block 200 comprises metadata 201 and blockchain data 202.

The metadata 201 has information about how the blockchain data 202 in each authentication/encryption block 200 is encrypted and authentication level(s)/security levels required to access the blockchain data 202. The blockchain data 202 is data that is part of the blockchain 121. Blockchain data 202 that is part of the blockchain 121 includes data that is in the authentication/encryption block 200 and the blockchain data 202 pointed to by the authentication/encryption block 200 (e.g., by the pointer to the Field N as shown in FIG. 2A).

The metadata 201 in FIG. 2A indicates that the blockchain data 202 is encrypted using Data Encryption Standard (DES) 64-bit encryption. The user must provide their username/password and a fingerprint scan and have level two security access to access the blockchain data 202. If these requirements are met, the fields A-N are unencrypted when the user wants to access the blockchain data 202 in the authentication/encryption block 200.

When the authentication/encryption block 200 is added to the blockchain 121, the data within (fields A and B) is encrypted by the trusted authority 120 at the block level based on the metadata 201. Likewise, the blockchain data 202 pointed to by the pointer in the authentication/encryption block 200 is also encrypted according to the metadata 201. The authentication/encryption block 200 of FIG. 2A allows the system to provide individualized encryption on a block-by-block basis. Hashes of the authentication/encryption block 200 are generated based on the encrypted blockchain data 202.

The metadata 201 is described herein as text for easier understanding. However, the metadata 201 may be in other forms, such as, numbers, binary information, machine code, and/or the like. For example, the encryption type may be represented by a numeric value.

In one embodiment, the metadata 201 of FIG. 2A may also apply to some or all of the blockchain 121. For example, the metadata 201 may apply to the whole blockchain 121.

FIG. 2B is a diagram of a second illustrative authentication/encryption block 200. The authentication/encryption block 200 also comprises the metadata 201 and the blockchain data 202. In FIG. 2B, the metadata 201 indicates that the authentication/encryption block 200 has same three fields. However, the authentication required, the security level, and the types of encryption for each field are different. The first field (field A) is not encrypted, requires no authentication factors to access, and requires no security level to access. The second field (Field B) is encrypted with a 64-bit encryption key that uses the Data Encryption Standard (DES) encryption algorithm, requires a username/password to access, and requires security level one to access. The third field (Field N) is encrypted with a 256-bit encryption key that uses the Rivest-Shamir-Adleman (RSA) algorithm, requires two authentication factors (username/password and an SMS code) to access, and requires security level two to access.

The authentication/encryption block 200 of FIG. 2B allows the system to not only provide individualized encryption on a block-by-block basis, but also provides individualized encryption on a field-by-field basis in the authentication/encryption block 200. Hashes of the authentication/encryption block 200 are generated based on the encrypted blockchain data 202 along with the non-encrypted blockchain data for field A.

In one embodiment, the metadata 201 of FIG. 2B may also apply to some or all of the blockchain 121. For example, the metadata 201 may apply to the whole blockchain 121.

Figure 3:
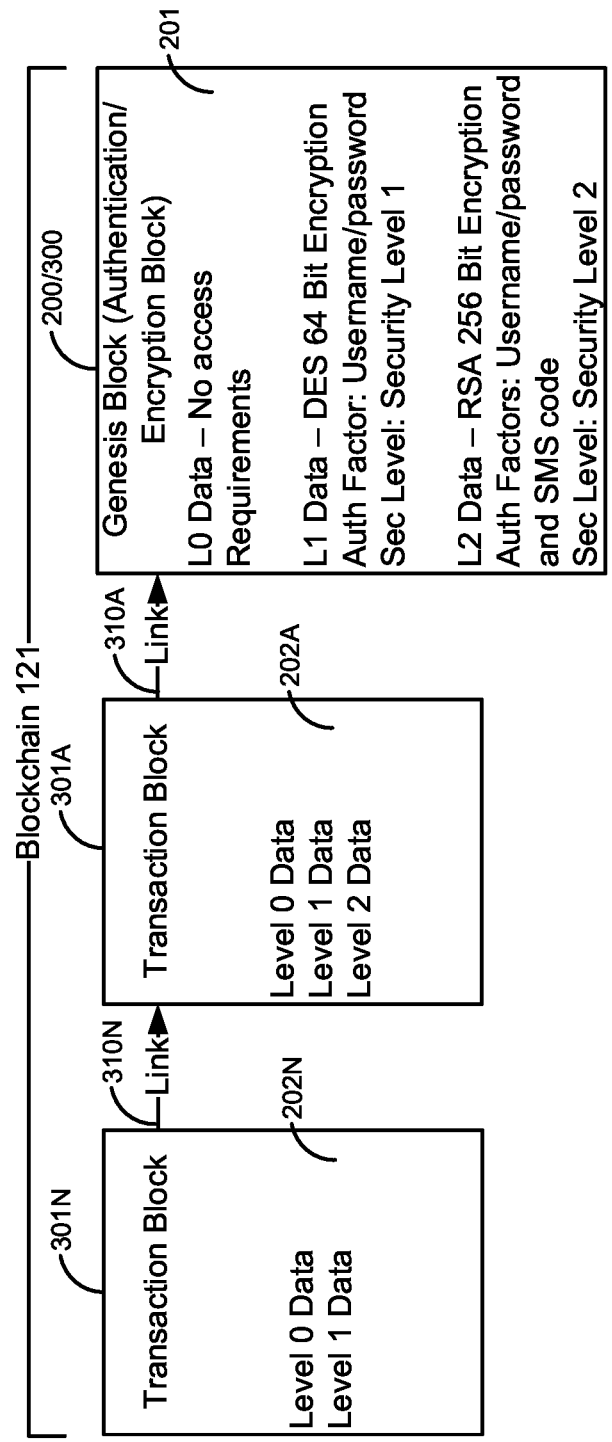
FIG. 3 is a diagram of blockchain that has an authentication/encryption block as a genesis block.

FIG. 3 is a diagram of blockchain 121 that has an authentication/encryption block 200 as a genesis block 300. FIG. 3 comprises a genesis block 300/authentication/encryption block 200, a transaction block 301A, a transaction block 301N, and forward links 310A-310N.

The forward links 310A-310N are standard forward hash links that are used with standard blockchains 121. The forward links 310A-310N may comprise a set of backward hash links or other types of links that links the blocks 300/200 and/301A-301N together.

The genesis block 300 is the first block in a blockchain 121. In FIG. 3, the genesis block 300 is also the authentication/encryption block 200. The genesis block 300/authentication/encryption block 200 has metadata 201 (the same metadata 201 as shown in FIG. 2B) that indicates the authentication levels/encryption levels for specific types of blockchain data 202 that are in the transaction blocks 301A-301N. In FIG. 3, the metadata 201 applies at a blockchain level instead of at the authentication/encryption block 200 level as described in FIGS. 2A-2B. Although not shown, the genesis block 300/authentication/encryption block 200 may have blockchain data 202.

The metadata 201 in the genesis block 300/authentication/encryption block 200 indicates that there are three types of data supported in the blockchain 121: 1) level zero blockchain data 202 that is not encrypted, requires no authentication factors, and requires no security level, 2) level one blockchain data 202 that is encrypted using 64 bit DES encryption, requires a username/password, and requires level 1 security clearance (level two or higher will work as well), and 3) level two blockchain data 202 that is encrypted using 256 bit RSA encryption, requires a username/password and a SMS verification code, and requires a level two security clearance or higher.

When a new transaction block 301 is added to the blockchain 121, the blockchain data 202 in the new transaction block 301 is encrypted according to the level(s)/type(s) and is only accessible based on the proper authentication levels/security levels. In FIG. 3, the transaction blocks 301A-301N may have metadata 201 (not shown for convenience) that identifies the level for each field contained within or pointed to by the transaction block 301. For example, transaction block 301A has level 0 blockchain data 202A, level one blockchain data 202A, and level two blockchain data 202A while transaction block 301N only has level zero blockchain data 202N and level one blockchain data 202N.

Figure 4:
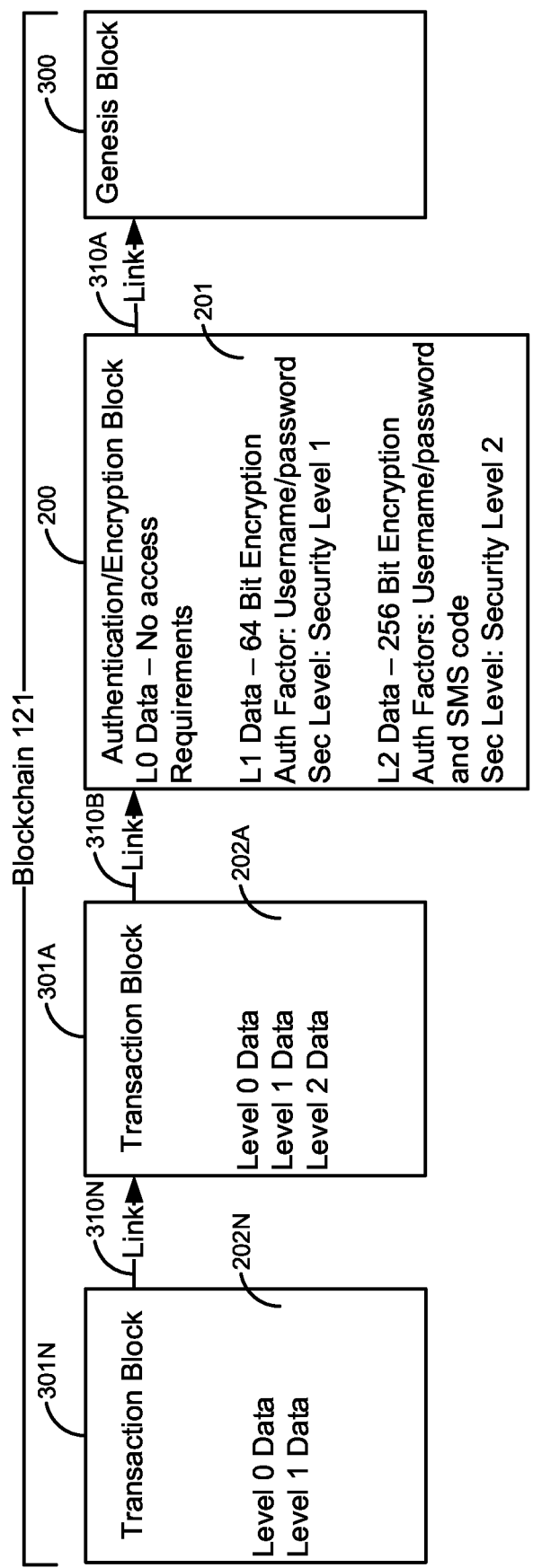
FIG. 4 is a diagram of a blockchain that has an authentication/encryption block after a genesis block.

FIG. 4 is a diagram of a blockchain 121 that has an authentication/encryption block 200 after a genesis block 300. The primary difference between FIG. 3 and FIG. 4 is that the first block in the blockchain 121 after the genesis block 300 is the authentication/encryption block 200. In FIG. 4, the metadata 201 in the authentication/encryption block 200 is the same as shown in FIG. 3. Likewise, the blockchain data 202A-202N is the same. Because the metadata 201 is the same as in FIG. 3, the blockchain data 202A-202N is encrypted in the same manner as described in FIG. 3. Likewise, access is granted in the same manner as described in FIG. 3.

Figure 5:
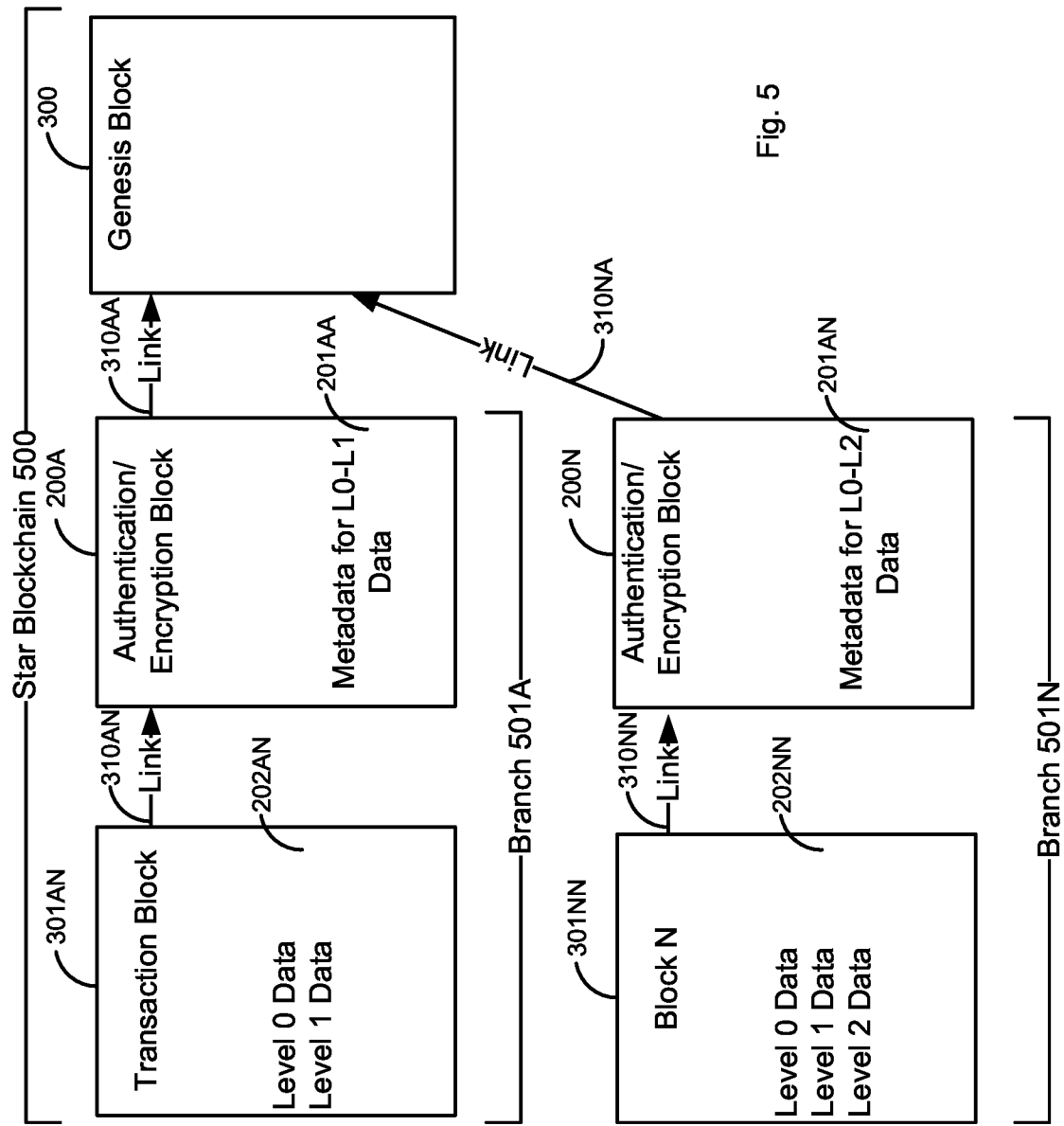
FIG. 5 is a diagram of a star blockchain that has an authentication/encryption block in each branch off a genesis block of the star blockchain.

FIG. 5 is a diagram of a star blockchain 500 that has an authentication/encryption block 200A-200N in each branch 501A-501N off a genesis block 300 of the star blockchain 500. The star blockchain 500 has branches 501A-501N (meaning any number of branches 501 may link to the genesis block 300).

When a branch 501 of the star blockchain 500 is created, an authentication/encryption block 200 may be added at the beginning of each branch 501 as shown in FIG. 5 (or only specific branches 501). The authentication/encryption blocks 200A-200N for the branches 501A-501N works like the authentication/encryption block 200 of FIG. 4, but on a branch 501A-501N level instead of at a blockchain 121 level. The authentication/encryption block 200A-200N for each branch 501A-501N may have different authentication/encryption requirements for the blockchain data 202AN/202NN within each branch 501A-501N. For example, as shown in FIG. 5, branch 501N has level zero through level two blockchain data 202NN where the branch 501A does not have any level two blockchain data 202AN. Alternatively, branch 501N may require, the same authentication factor(s), additional authentication factor(s), less authentication factor(s), different authentication factor(s), and/or no authentication factors for access to any of the level(s) of data. Likewise, the encryption levels/types and/or security types may be different based on implementation.

In one embodiment (not shown), the genesis block 300 of the star blockchain 500 may have the metadata 201 like shown in the genesis block 300 of FIG. 3. In this embodiment, the genesis block 300/authentication/encryption block 200 defines the same encryption levels, authentication levels, and/or security levels for all the branches 501A-501N in the star blockchain 500. In this embodiment, the individual branches 501A-501N may not include an authentication/encryption block 200.

In another embodiment, the star blockchain 500 may have a genesis block 300/authentication/encryption block 200 that defines the authentication levels/factors, security levels, and encryption levels/types for the star blockchain 500. However, for some branches 501, there may be an authentication/encryption block 200 at the beginning of the branch 501 that overrides the metadata 201 in the genesis block 300 for the specific branch 501.

The star blockchain 500 has forward links 310AA-310AN/310NA-301NN for each branch 501. For example, the branch 501A has forward links 310AA-310AN. Likewise, the branch 501N has forward links 310NA-310NN.

Figure 6:
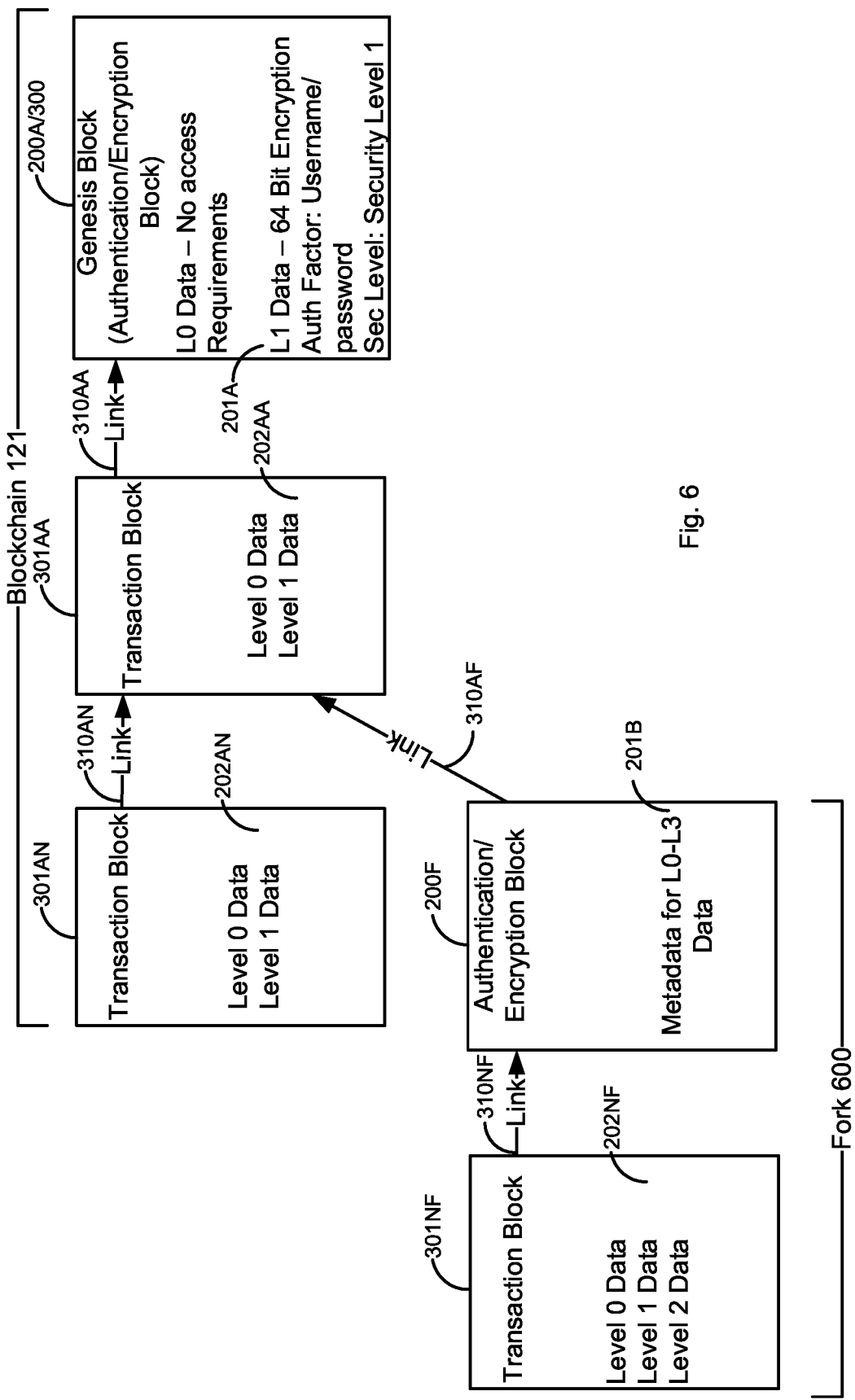
FIG. 6 is a diagram of a blockchain that has an authentication/encryption block that is added when a fork is added to the blockchain.

FIG. 6 is a diagram of a blockchain 121 that has an authentication/encryption block 200F that is added when a fork 600 is added to the blockchain 121. The blockchain 121 of FIG. 6 comprises the genesis block 300/authentication/encryption block 200A, and transactions blocks 301AA-301AN. The blockchain 121 has forward links 310AA-310AN.

The blockchain 121 has a fork 600. The fork 600 comprises authentication/encryption block 200F and transaction block 301NF. The transaction block 301NF links to the authentication/encryption block 200F via forward link 310NF. The authentication/encryption block 200F links to the transaction block 301AA via forward link 310AF.

The blockchain 121 may be forked for various reasons, such as, based on new rules for the fork 600. By adding the authentication/encryption block 200F as the first block in the fork 600, the fork 600 may have different rules for encryption and/or authentication of blocks (e.g., transaction block 301NF). For example, the fork 600 could use encryption key one and the blockchain 121 could use encryption key two for the same level of data. The encryption key may be the same size and/or encryption type or may use a different size and/or encryption type. For example, the fork 600 may require more security/higher encryption/different encryption algorithm(s) than the main blockchain 121 for Level 2 data. The blockchain data 202 (e.g., 202NF) in the fork 600 may be data for the same record (e.g., username address in the blockchain 121 and social security number/credit card number in the fork 600). For example, the transaction block 301AN in the blockchain 121 may have a username/address encrypted with encryption key one and the user's social security number/credit card number in transaction block 300NF in the fork 600 encrypted with an encryption key that is a higher level of encryption. Access to the encrypted blockchain data 202 requires the proper authentication level(s)/security level(s).

As shown in FIG. 6, the blockchain 121 only has authentication levels 0-1 for the blockchain data 202AA-202AN while the fork 600 has authentication levels 0-2 for the blockchain data 202NF. In FIG. 6, the fork 600 allows for adding additional levels of security (or less depending on implementation) for the blockchain data 202.

The above process could apply to consolidation blocks/blockchains 121 as described in Patent Cooperation Treaty Application No. US2021/033207 entitled "Blockchain Consolidation with Active Archiving", which is incorporated herein in its entirety by reference. A consolidation blockchain 121 is where an existing blockchain 121 is ended and a new blockchain 121 with a new genesis block 300 is created with a link back to the original blockchain 121. For example, an authentication/encryption block 200 may be added after the genesis block 300 when creating a new consolidation blockchain 121. In this case, the authentication/encryption block 200 may have the same metadata 201 as used previously in the consolidated blockchain 121. Alternatively, the authentication/encryption block 200 may change the metadata 201 required for the new consolidation blockchain 121.

Figure 7:
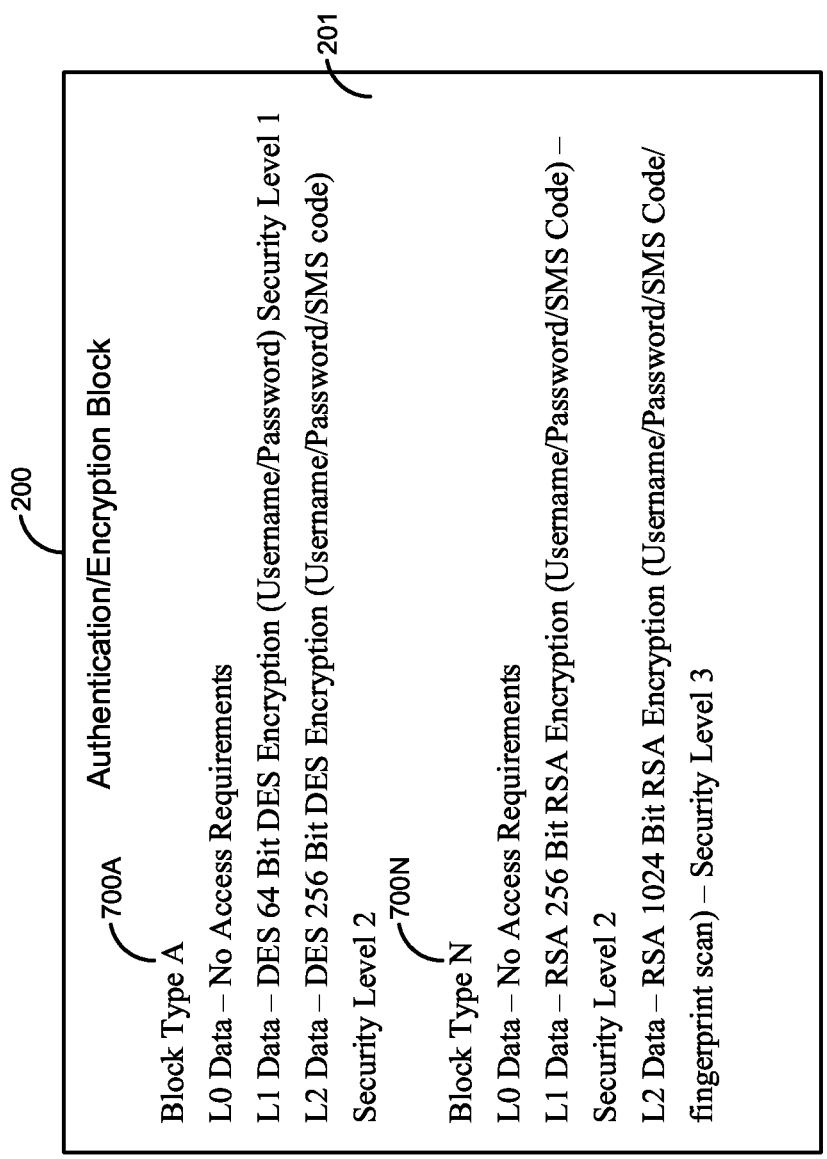
FIG. 7 is a diagram of an authentication/encryption block that uses block types.

FIG. 7 is a diagram of an authentication/encryption block 200 that uses block types 700A-700N. The authentication/encryption block 200 of FIG. 7 may be a genesis block 300, a first block in a blockchain 121, a first block in a branch 501, a first block in a fork 600, a first block/genesis block 300 in a consolidation blockchain 121 and/or the like.

The block types 700A-700N define the rules that are used for the transaction blocks 301. In FIG. 7, the block type 700A defines the level 0 blockchain data 202 as having no access requirements, the level one blockchain data 202 has being encrypted using 64 bit DES encryption, requiring a username/password, and requiring security level one, and the level two blockchain data 202 as being encrypted using 256 DES encryption, requiring a username/password/SMS code, and requiring security level two.

The block type 700N defines the level 0 blockchain data 202 as having no access requirements, the level one blockchain data 202 as being encrypted using 256-bit RSA encryption, requiring a username/password/SMS code, and requiring security level two, and the level two blockchain data 202 as being encrypted using 1024-bit RSA encryption, requiring a username/password/SMS Code/fingerprint scan, and requiring security level three.

When a transaction block 301 is added to the blockchain 121, the transaction block 301 will have a block type field with an identifier that corresponds to the respective block type 700A-700N. For example, the first transaction block 301 in the blockchain 121 may have the block type 700A and the second transaction block 301 in the blockchain 121 may have the block type 700N. Access/encryption of each transaction block 301 is accomplished according to the block type 700 defined in the transaction block 301/authentication/encryption block 200. The block type may be part of the metadata 201 in the transaction block 301.

Figure 8:
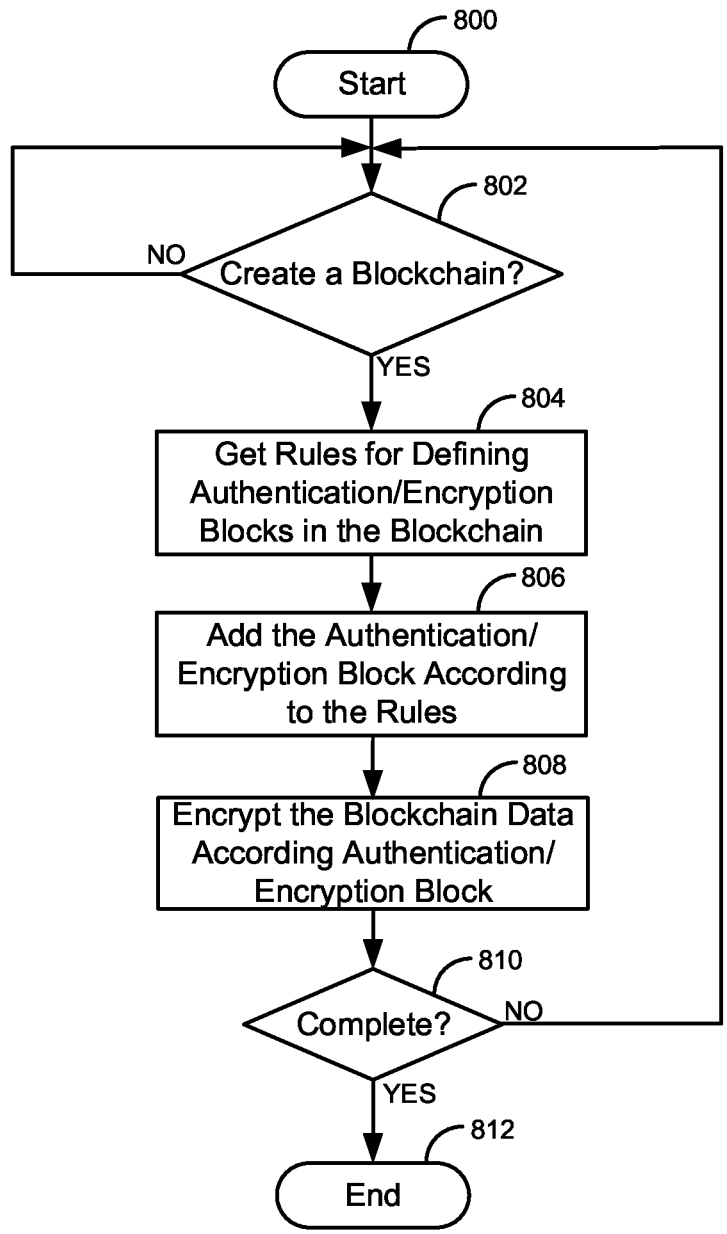
FIG. 8 is a flow diagram of a process for adding an authentication/encryption block when a blockchain is created.

FIG. 8 is a flow diagram of a process for adding an authentication/encryption block 200 when a blockchain 121 is created. Illustratively, the communication devices 101A-101N, the authentication modules 102A-102N, the trusted authority 120, the blockchain(s) 121, the distributed ledger(s) 122, the block manager 123, and the authentication module 124 are stored-program-controlled entities, such as a computer or microprocessor, which performs the method of FIGS. 8-11 and the processes described herein by executing program instructions stored in a computer readable storage medium, such as a memory (i.e., a computer memory, a hard disk, and/or the like). Although the methods described in FIGS. 8-11 are shown in a specific order, one of skill in the art would recognize that the steps in FIGS. 8-11 may be implemented in different orders and/or be implemented in a multi-threaded environment. Moreover, various steps may be omitted or added based on implementation.

The process of FIG. 8 is shown from perspective of the trusted authority 120. The process starts in step 800. The block manager 123 determines, in step 802, if a request to create a new blockchain 121 has been received. The request to create a new blockchain 121 may occur in different ways. For example, an administrator's action may create the request to create a new blockchain 121, a user's action may create the request to create the blockchain 121, a transaction may create the request to create the blockchain 121, an event may create the request to create the blockchain 121, and/or the like.

If a request to create a new blockchain 121 is not received in step 802, the process of step 802 repeats. Otherwise, if the request to create a new blockchain 121 is received in step 802, the block manager 123 gets rules for defining the authentication/encryption block 200 in step 804. The rules may be user defined rules, predefined rules, and/or the like. For example, an administrator may define some or all the rules. The rules define what authentication level(s)/encryption level(s)/encryption type(s)/security level(s) will be used for the blockchain 121, for individual blocks, for branches 501, for forks 600, for consolidation blocks, and/or the like.

The block manager 123 adds the authentication/encryption block 200 to the blockchain 121/distributed ledger 122 according to the rules in step 806. For example, the rules may define that the genesis block 300 of the blockchain 121 is the authentication/encryption block 200 and that the authentication/encryption block 200 applies to the entire blockchain 121. Alternatively, a genesis block 300 may first be created and then the authentication/encryption block 200 is added as the first block after the genesis block 300. If the authentication/encryption block 200 comprises blockchain data 202 (e.g., as described in FIGS. 2A-2B), the blockchain data 202 in the authentication/encryption block 200 is encrypted according to the metadata 201 in the authentication/encryption block 200 in step 808.

The block manager 123 determines, in step 810, if the process is complete. If the process is not complete, the process goes back to step 802. Otherwise, if the process is complete in step 810, the process ends in step 812.

Figure 9:
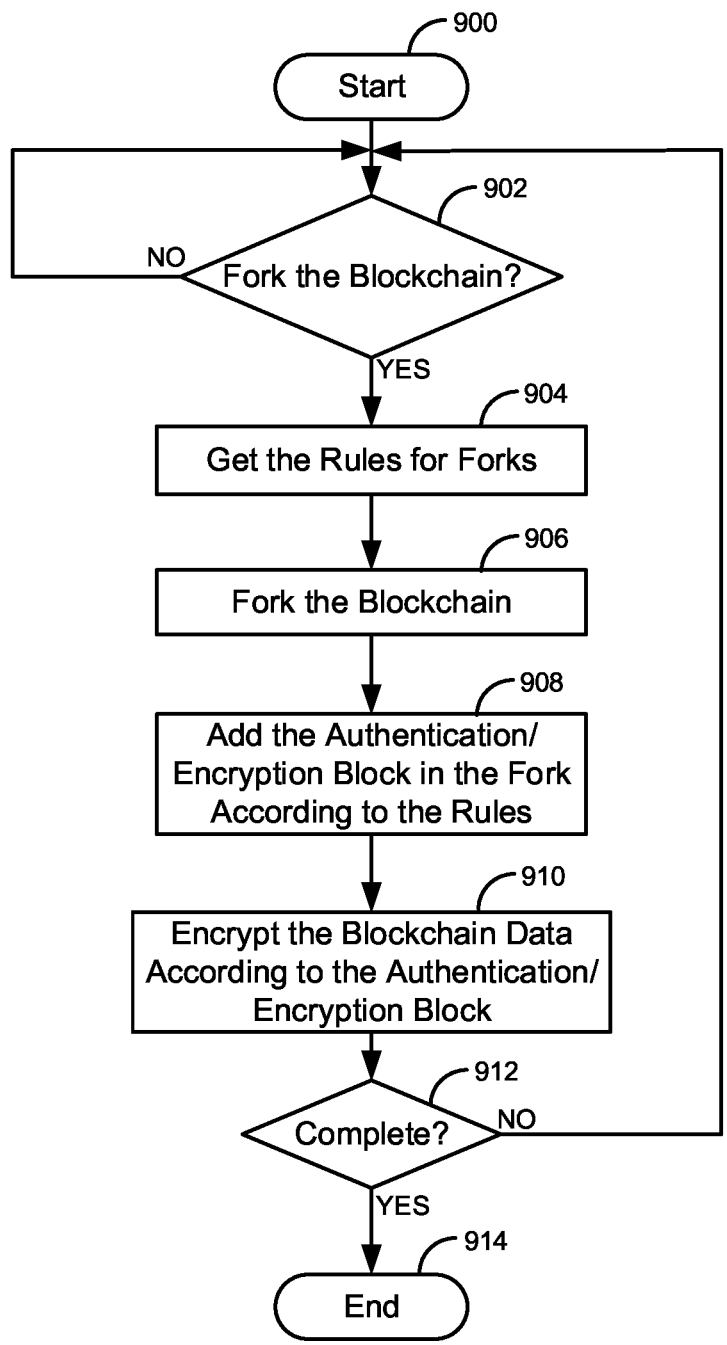
FIG. 9 is a flow diagram of a process for adding an authentication/encryption block to a blockchain when the blockchain is forked.

FIG. 9 is a flow diagram of a process for adding an authentication/encryption block 200 to a blockchain 121 when the blockchain 121 is forked. The process starts in step 900. The block manager 123 determines, in step 902, if a request to fork the blockchain 121 has been received. The request to fork the blockchain 121 may occur for various reasons, such as, for defining new rules for a type of blockchain data 202, applying new encryption levels to some of the blockchain data 202, based on an event, and/or the like.

If a request to fork the blockchain 121 is not received in step 902, the process of step 902 repeats. Otherwise, if the request to fork the blockchain 121 is received in step 902, the block manager 123 gets the rules for forks in step 904. The rules for forks may be predefined, user defined, and/or the like. The block manager 123 forks the blockchain 121 in step 906. The block manager 123 adds the authentication/encryption block 200 in the fork 600 according to the rules in step 908 (e.g., as shown in FIG. 6).

If the authentication/encryption block 200 also comprises blockchain data 202 (e.g., as described in FIGS. 2A-2B), the blockchain data 202 in the authentication/encryption block 200 is encrypted according to the metadata 201 in the authentication/encryption block 200 in step 910. As new transaction blocks 301 are added to the fork 600, the blockchain data 202 is encrypted according to the authentication/encryption block 200 for the fork.

The block manager 123 determines, in step 912, if the process is complete. If the process is not complete in step 912, the process goes back to step 902. Otherwise, if the process is complete in step 912, the process ends in step 914.

Figure 10:
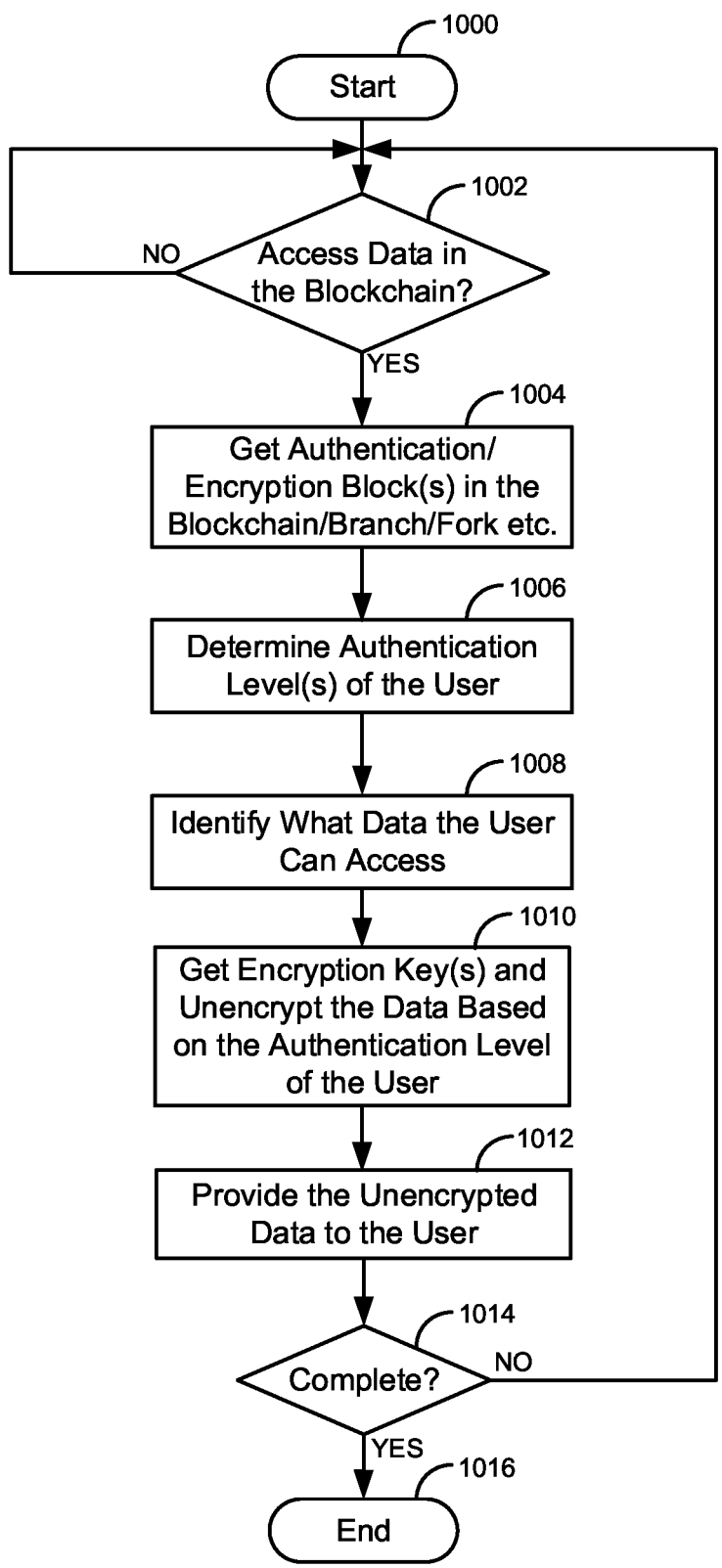
FIG. 10 is a flow diagram of a process for using a trusted authority to enforce encryption levels/encryption types/authentication levels/security levels in a blockchain.

FIG. 10 is a flow diagram of a process for using a trusted authority 120 to enforce encryption levels/encryption types/authentication levels/security levels in a blockchain 121. The process starts in step 1000. The block manager 123 determines if a request is made to access blockchain data 202 in step 1002. If a request has not been made to access the blockchain data 202 in step 1002, the process of step 1002 repeats. Otherwise, if a request to access the blockchain data 202 is received in step 1002, the block manager 123, in step 1004, gets the metadata 201 in the authentication/encryption block(s) 200 in the blockchain 121, in the fork 600, in the consolidation blockchain 121, etc. in step 1004.

The block manager 123 determines, in step 1006, what authentication level/security level the user has. The block manager 123, from the authentication/encryption block 200, determines what blockchain data 202 the user can access in step 1008 based on the user's current authentication level/security level. For example, the user may have security level two clearance, but has only authenticated at authentication level one. In this case, level two data may not be accessible based on the rules. The block manager 123 gets the encryption key(s) and unencrypts the blockchain data 202 based on the authentication level/security level of the user/authentication/encryption block(s) in step 1010. The block manager 123, provides, in step 1012, the unencrypted blockchain data 202 that the user has permissions for to the user.

The block manager 123 determines, in step 1014, if the process is complete. If the process is not complete in step 1014, the process goes back to step 1002. Otherwise, if the process is complete in step 1014, the process ends in step 1016.

In another embodiment, if the user has authenticated using the required authentication factors at the trusted authority 120 and has the necessary security level, the block manager 123 provides the encryption key(s) to unencrypt the blockchain data 202 and to view the blockchain data 202. In this embodiment, the blockchain 121 may reside on the communication device 101 or in a distributed ledger 122 that is external to the trusted authority 120.

Figure 11:
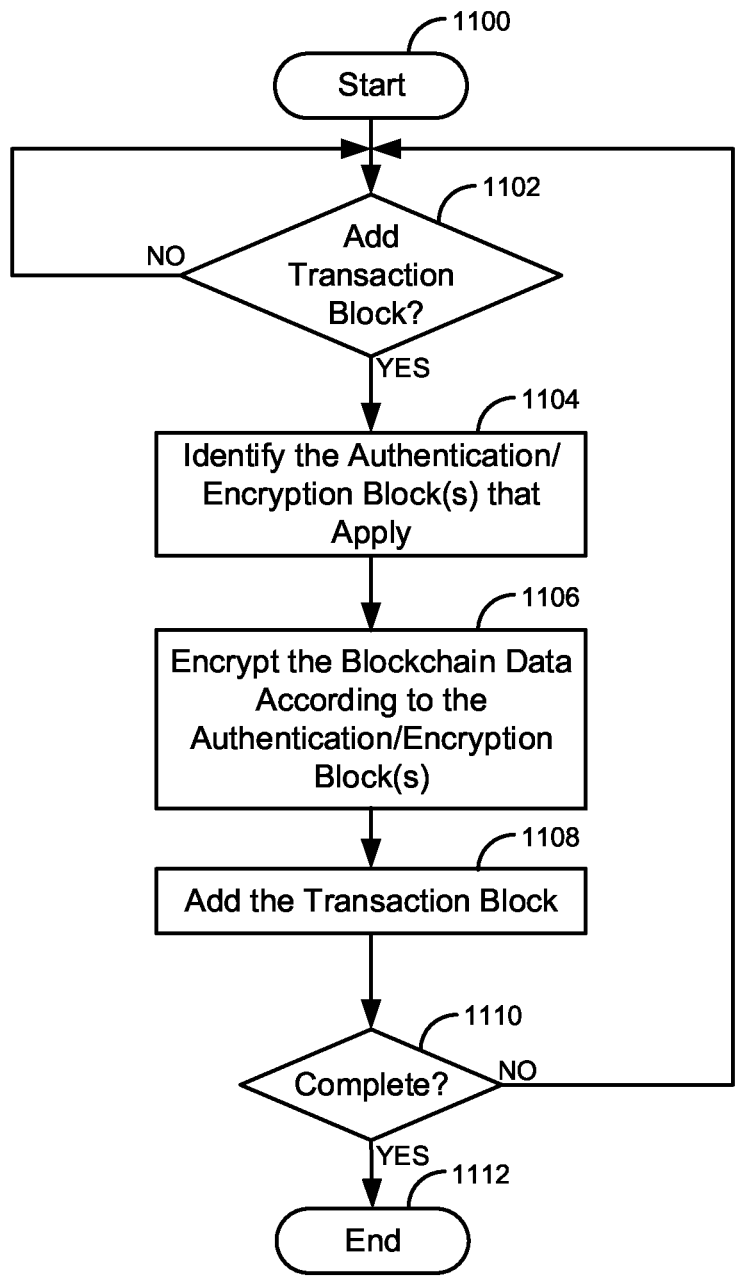
FIG. 11 is a flow diagram of adding transaction blocks to a blockchain.

FIG. 11 is a flow diagram of adding transaction blocks 301 to a blockchain 121. The process starts in step 1100. The block manager 123 waits for a request to add a transaction block 301 in step 1102. The request to add the transaction block 301 may be based on a consensus vote by the distributed ledger 122. If a request to add the transaction block 301 has not been received in step 1102, the process of step 1102 repeats.

Otherwise, if a request to add the transaction block 301 has been received in step 1102, the block manager 123 identifies, in step 1104, the authentication/encryption block(s) 200 that apply to the transaction block 301. Typically, there will only be a single authentication/encryption block 200 that will apply (e.g., as shown in FIG. 3). However, in one embodiment, multiple authentication/encryption blocks 200 may apply to the blockchain data 202 in the transaction block 301. For example, an additional authentication/encryption block 200 may be added to the end of the blockchain 121 of FIG. 3. The additional authentication/encryption block 200 defines authentication/encryption/security level values for level three data within the authentication/encryption block 200 (not covered by the authentication/encryption block 200 of FIG. 3). In addition, the additional authentication/encryption block 200 may contain level zero-level three data that is covered by the authentication/encryption block 200 (the genesis block 300). Thus, the level zero through level two blockchain data 202 is governed by the genesis block 300/authentication/encryption block 200 and the level three blockchain data 202 is governed by the additional authentication/encryption block 200. The block manager 123 encrypts the blockchain data 202 according to the authentication encryption block(s) 200 in step 1106. The block manager 123 then adds the transaction block 301 to the blockchain 121/distributed ledger 122 in step 1108.

The block manager 123 determines, in step 1110, if the process is complete. If the process is not complete in step 1110, the process goes back to step 1102. Otherwise, if the process is complete in step 1110, the process ends in step 1112.

In one embodiment, when a transaction block 301 is to be added in step 1108, the transaction block 301 is sent to the trusted authority 120 with the blockchain data 202 unencrypted. For example, when the transaction block 301N of FIG. 3 is added, the block manager 123 can determine the encryption level/block type based on the authentication/encryption block 200/genesis block 300. Based on this information, the block manager 123 encrypts the blockchain data 202 in the transaction block 301 and/or pointed to by the transaction block 301 based on the authentication/encryption block 200. The transaction block 301 is then added to the blockchain 121/distributed ledger 122

The blockchain data 202 could be encrypted using a Macali encryption key that allows multiple users to access the blockchain data 202/portion of the blockchain data 202. The access may be at a group level access and/or at an individual level.

In one embodiment, the trusted authority 120 may also have a second blockchain 121 for the user authentications. For example, each time a user authenticates using any authentication process, a transaction block 301 is added to an authentication blockchain 121 that is separate from the blockchain 121. The authentication blockchain 121 may be created on a user basis, on a group basis, on a corporate bases, on a system basis, and/or the like.

Because the trusted authority 120 provides a common access platform, the metadata 201 in the authentication/encryption block 200 defines the access/encryption rules; thus, the rules can be enforced between domains. For example, a user of the communication device 101A may be in domain one and a user of the communication device 101N may be in a second domain (e.g., at different companies). The trusted authority 120 and the metadata 201 in the authentication/encryption block 200 provides uniform access/encryption rules between the domains.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that can supply and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

Several variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the function, and the software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to standards and protocols, the disclosure is not limited to such standards and protocols. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether such alternate, interchangeable and/or equivalent structures, functions, ranges, or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a request to create a blockchain;
in response to receiving the request to create the blockchain, add a first authentication/encryption block to the blockchain, wherein the first authentication/encryption block comprises metadata that indicates at least one of:
an encryption level for first blockchain data that will be part of the blockchain, the encryption level being selected from among a plurality of encryption levels, each encryption level comprising a different encryption key to be used for decryption;
an encryption type for the first blockchain data that will be part the blockchain, the encryption type being selected from a plurality of encryption types, each encryption type comprising a different encryption algorithm;
an authentication level required to access the first blockchain data that will be part of the blockchain, the authentication level being selected from a plurality of authentication levels, each authentication level comprising a different set of authentication factors required to access the first blockchain data; and
a security level for the first blockchain data that will be part of the blockchain, the security level being selected from a plurality of security levels, each security level comprising a different set of entities authorized to access the first blockchain data.

2. The system of claim 1, wherein the first authentication/encryption block is one of: a genesis block of the blockchain or a first block after the genesis block of the blockchain, wherein the metadata indicates the encryption level, and wherein each encryption level corresponds to an encryption key of differing bit length.

3. The system of claim 2, where the blockchain is a star blockchain.

4. The system of claim 3, wherein at least one branch in the star blockchain has a second authentication/encryption block that overrides the first authentication/encryption block.

5. The system of claim 1, wherein the blockchain is a star blockchain and wherein the first authentication/encryption block comprises a plurality of authentication/encryption blocks that are a first block off a genesis block in each branch of the star blockchain, wherein the metadata indicates the encryption type, and wherein each encryption type comprises one or more of a Data Encryption Standard (DES) encryption algorithm and a Rivest-Shamir-Adleman (RSA) encryption algorithm.

6. The system of claim 1, wherein the blockchain comprises a second authentication/encryption block and wherein the second authentication/encryption block is a first block in a fork of the blockchain.

7. The system of claim 1, wherein the metadata of the first authentication/encryption block comprises a plurality of encryptions levels for a plurality of blockchain data that will be part of the blockchain.

8. The system of claim 1, wherein the metadata of the first authentication/encryption block comprises a plurality of authentication levels required to access a plurality of blockchain data that will be part of the blockchain.

9. The system of claim 8, wherein a trusted authority enforces the plurality of authentication levels.

10. The system of claim 1, wherein the metadata in the first authentication/encryption block identifies a plurality of block types, wherein the plurality of block types has different metadata for each of the plurality of block types, wherein the metadata indicates the authentication level, and wherein each set of authentication factors comprises one or more of fingerprint scan, username, password, and short message service (SMS) verification code.

11. The system of claim 1, wherein the first authentication/encryption block comprises a plurality of authentication/encryption blocks and wherein a first one of the plurality of authentication blocks defines the encryption level, the encryption type, the authentication level, and/or the security level at a blockchain level and wherein a second one of the plurality of authentication blocks defines a separate encryption level, a separate encryption type, a separate authentication level, and/or a separate security level for blockchain data within the second one of the plurality of authentication blocks.

12. The system of claim 1, wherein the microprocessor readable and executable instructions further cause the microprocessor to:
receive a request to add a transaction block to the blockchain;
in response to receiving the request to add the transaction block to the blockchain, identify the encryption level for the first blockchain data and the encryption type for the first blockchain data in the first authentication/encryption block; and
encrypt the first blockchain data using an encryption key of a first encryption level and an encryption algorithm of the encryption type.

13. A method comprising:
receiving, by a microprocessor, a request to create a blockchain;
in response to receiving the request to create the blockchain, adding, by the microprocessor, a authentication/encryption block to the blockchain, wherein the authentication/encryption block comprises metadata that indicates at least one of:
an encryption level for blockchain data that will be part of the blockchain;
an encryption type for the blockchain data that will be part the blockchain;
an authentication level required to access the blockchain data that will be part of the blockchain; and
a security level for the blockchain data that will be part of the blockchain;
receiving a request to add a transaction block to the blockchain;
in response to receiving the request to add the transaction block to the blockchain, identifying the encryption level for the blockchain data and the encryption type for the blockchain data in the authentication/encryption block; and
encrypting the blockchain data using an encryption key of the encryption level and an encryption algorithm of the encryption type.

14. The method of claim 13, wherein the authentication/encryption block is one of: a genesis block of the blockchain or a first block after the genesis block of the blockchain.

15. The method of claim 13, wherein the blockchain is a star blockchain and wherein the authentication/encryption block comprises a plurality of authentication/encryption blocks that are a first block off a genesis block in each branch of the star blockchain.

16. The method of claim 13, wherein the metadata of the authentication/encryption block comprises a plurality of encryptions levels for a plurality of blockchain data that will be part of the blockchain.

17. The method of claim 13, wherein the metadata of the authentication/encryption block comprises a plurality of authentication levels required to access a plurality of blockchain data that will be part of the blockchain.

18. The method of claim 13, wherein the metadata in the authentication/encryption block identifies a plurality of block types, wherein the plurality of block types has different metadata for each of the plurality of block types.

19. The method of claim 13,
wherein the encryption level is selected from among a plurality of encryption levels, each encryption level comprising a different encryption key to be used for decryption, wherein the encryption type is selected from a plurality of encryption types, each encryption type comprising a different encryption algorithm, wherein the authentication level is selected from a plurality of authentication levels, each authentication level comprising a different set of authentication factors required to access first blockchain data, and wherein the security level is selected from a plurality of security levels, each security level comprising a different set of entities authorized to access the first blockchain data.

20. A non-transient computer readable medium having stored thereon instructions that cause a processor to execute a method, the method comprising instructions to:
receive a request to create a blockchain;
in response to receiving the request to create the blockchain, add an authentication/encryption block to the blockchain, wherein the authentication/encryption block comprises metadata that indicates at least one of:
an encryption level for blockchain data that will be part of the blockchain;
an encryption type for the blockchain data that will be part the blockchain;
an authentication level required to access the blockchain data that will be part of the blockchain; and
a security level for the blockchain data that will be part of the blockchain,
wherein the authentication/encryption block comprises a plurality of authentication/encryption blocks, wherein a first one of the plurality of authentication blocks defines the encryption level, the encryption type, the authentication level, and/or the security level at a blockchain level and wherein a second one of the plurality of authentication blocks defines a separate encryption level, a separate encryption type, a separate authentication level, and/or a separate security level for blockchain data within the second one of the plurality of authentication blocks.

* * * * *